(No Model.)  
E. E. SELL.  
VELOCIPEDE.  
2 Sheets—Sheet 1.

No. 305,968.  Patented Sept. 30, 1884.

WITNESSES:  
James F. Tobin  
John E. Parker

INVENTOR:  
Edgar E. Sell  
by his Attys.  
Howson & Sons (No Model.) 2 Sheets—Sheet 2.
E. E. SELL.
VELOCIPEDE.
No. 305,968. Patented Sept. 30, 1884.
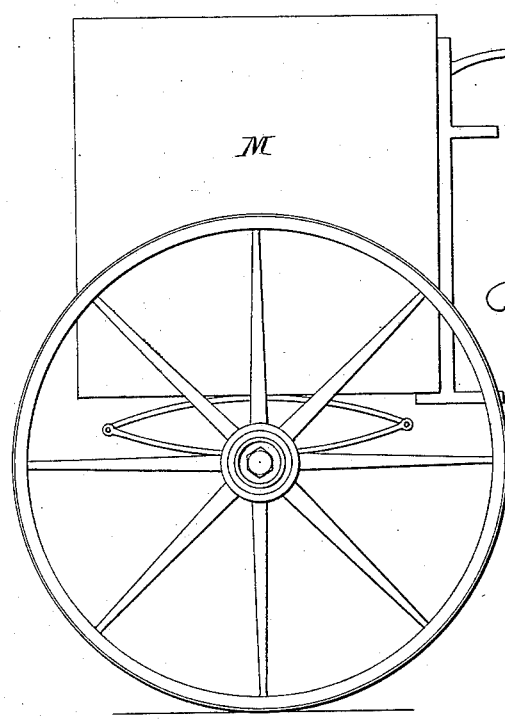
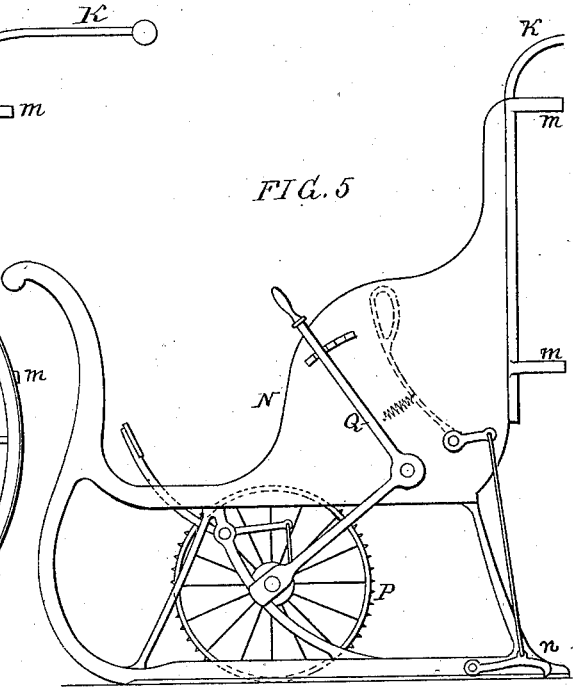
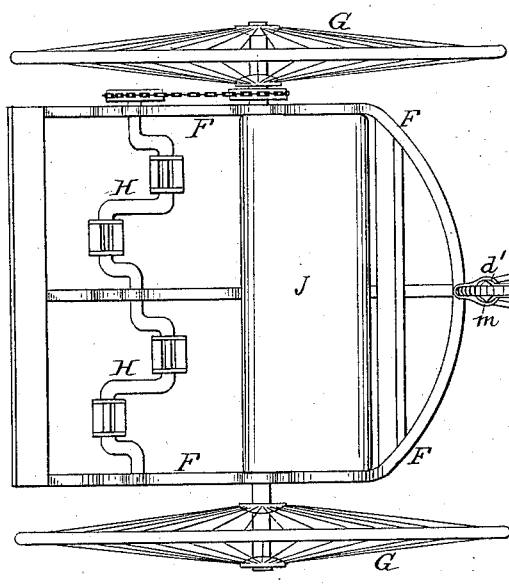
WITNESSES:
James F. Tobin
John E. Parker
INVENTOR:
Edgar E. Sell
by his attys
Howson & Sons

UNITED STATES PATENT OFFICE.

EDGAR E. SELL, OF CHARLESTON, SOUTH CAROLINA.

VELOCIPEDE.

SPECIFICATION forming part of Letters Patent No. 305,968, dated September 30, 1884.

Application filed March 10, 1884. (No model.)

*To all whom it may concern:*

Be it known that I, EDGAR E. SELL, a citizen of the United States, and a resident of Charleston, South Carolina, have invented certain Improvements in Velocipedes, of which the following is a specification.

The object of my invention is to so construct the frame of a bicycle that it can be hitched to a separate wheeled frame to form a tricycle or other vehicle, and this object I attain in the manner hereinafter set forth, reference being had to the accompanying drawings, in which—

Figure 2:
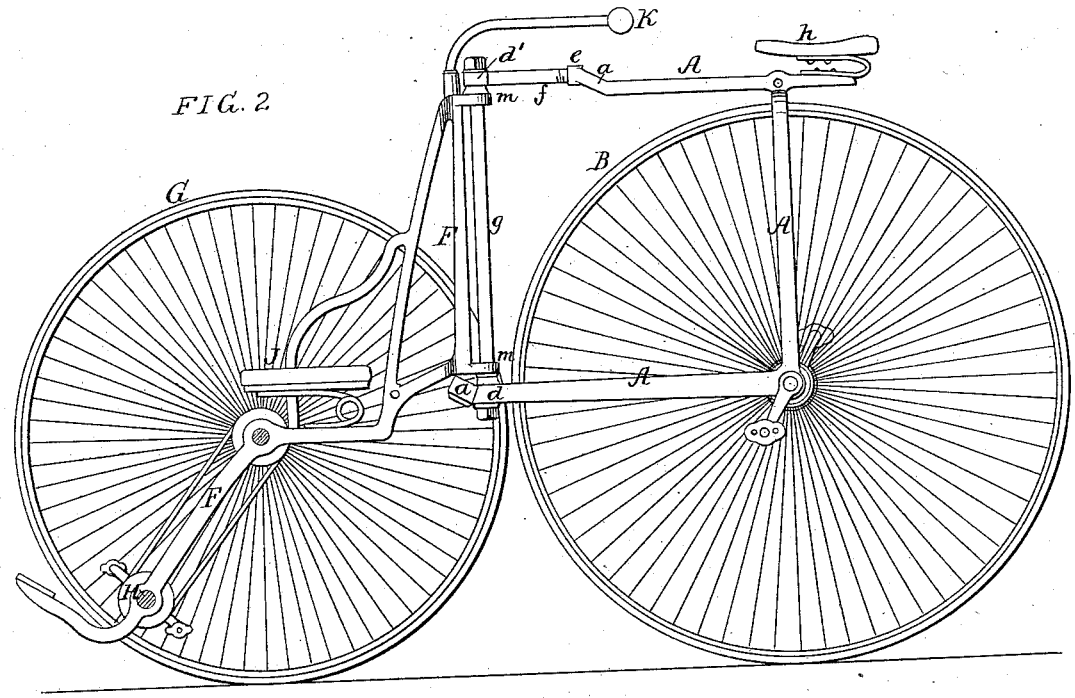
Figure 1:
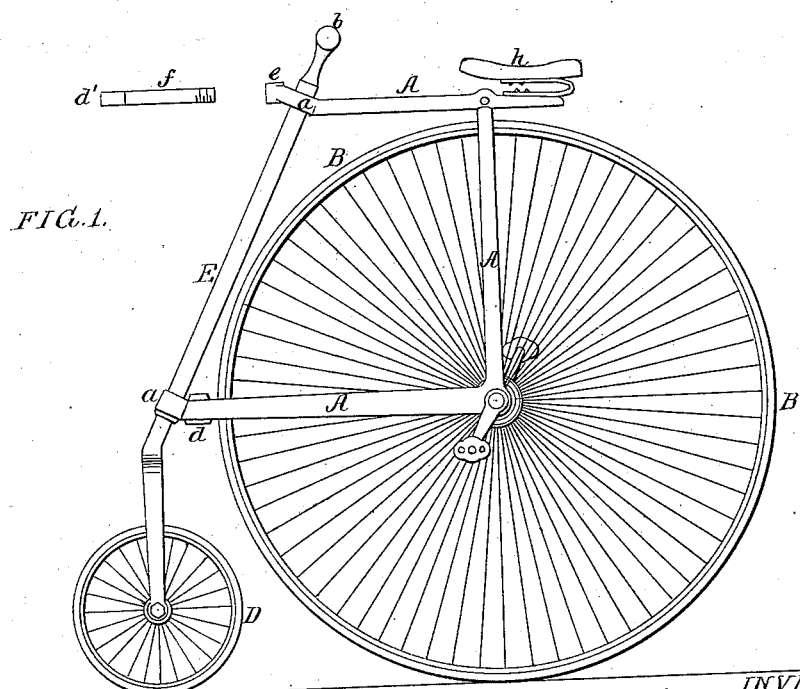

Figure 1 is a side view of a bicycle constructed in accordance with my invention; Fig. 2, a side view showing the same coupled to a separate wheeled frame to form a tricycle; Fig. 3, Sheet 2, a plan view of the tricyle, and Figs. 4 and 5 views of other forms of attachment to the bicycle-frame.

A is the frame of the bicycle; B, the large or driving wheel, with treadles of any desired pattern, and D the small or steering wheel, arranged in the present instance in front of the large wheel, and carried by the forked lower end of an inclined bar, E, which is adapted to bearings in eyes $a\,a$ on the frame A, and is furnished at the upper end with a steering-handle, $b$. On the lower portion of the frame is another eye, $d$, and at the top of the frame is a nut, $e$, for the reception of the inner threaded end of a rod, $f$, which has at the outer end an eye, $d'$, the rod being of such a length that when screwed into its place the eye $d'$ will be vertically in line with the eye $d$. The rod $f$ may, if desired, form a permanent part of the frame, although it is preferable to make it detachable. When the frame is constructed in this manner it is available for use as part of the frame of a tricycle or other vehicle. Thus in Figs. 2 and 3 the frame A is coupled to the frame F, which has opposite wheels G, a crank-shaft, H, from which said wheels are driven, and a seat, J, for an additional rider or riders, the whole forming a tricycle capable of seating three persons, all of whom may contribute to the propulsion of the vehicle, the shaft H being furnished with clutches, however, so that it can be thrown out of gear when its use for propulsion is not required. In this case the steering-bar E and the small wheel D of the bicycle are removed, and the frames A and F are pivoted together by means of a bolt, $g$, adapted to the eyes $d\,d'$ of the frame A, and to eyes $m\,m$ on the frame F. The latter frame has a steering-handle, K, projecting rearward, so as to be within easy reach of the occupant of the seat $h$ of the frame A, and by means of this handle the pivoted connection between the two frames may be deflected laterally, so as to cause the frames to assume opposite angles and thus cause the steering of the velocipede.

Where an ordinary tricycle without the additional driving-wheel, B, is required, the steering-bar E may be applied to the eyes $m$, the handle K being detached.

The frame A may be coupled to wheeled frames of different characters. For instance, in Fig. 4 I have shown a box or receptacle, M, mounted on wheels, and constructed for being coupled to the frame A, so as to form a light delivery-wagon; nor is it necessary that a wheeled frame should always be employed, as the frame A with its driving-wheel B may be used as a means of propelling a sleigh, N, as shown in Fig. 5, said sleigh being constructed in such a manner as to permit of the coupling of the frame A thereto in the manner above described.

Where the frame A and its wheel B are used in combination with a sleigh, the latter should have a claw-brake, $n$, in order to retard or stop the same, as a brake on the wheel B is not effective for this purpose, but simply renders the wheel a runner which slides with the sleigh over the ice. The sleigh should also have a toothed driving-wheel, P, operated by a suitable system of treadles and gearing, so that the occupants of the sleigh may aid in starting the same, one or both ends of the axle of the said wheel P being under control of a lever, Q, so that the wheel may be lifted clear of the ice when its use is not required.

An ordinary bicycle may have eyes $d\,d'$ projecting in the rear of the frame, to be coupled by a rod, $g$, to eyes $m\,m$ on a trailing frame, F; or instead of eyes on both frames hooks on one frame may be adapted to eyes on the other, or short bolts adapted to the eyes may be used instead of the single long bolt $g$.

I claim as my invention—

1. The combination of the frame A of a bicycle, having a rearwardly projecting portion, with eyes $d$ $d'$, with a supplementary vehicle having a frame, F, with eyes $m$ $m$, and with means, substantially as described, whereby said eyes $m$ $m$ are coupled to the eyes $d$ $d'$, as set forth.

2. The combination of the frame A, projecting in front of the driving-wheel B, the supplementary frame F, having a steering-handle, K, and means for coupling said frames A and F together, as set forth.

3. The combination of the bicycle-frame A, constructed for being coupled to a supplementary frame, F, with the steering-bar E, carrying the small wheel D of the bicycle, and detachable from the frame A, as set forth.

4. The combination of the frame A, having the lower eye, $d$, with the rod $f$, detachably connected to the upper part of the frame, and having an eye, $d'$, as set forth.

5. The combination of the frame A, having eyes $d$ $d'$, the frame F, having eyes $m$ $m$, and the pivot-bolt $g$, adapted to both sets of eyes, and serving to connect the two frames together, as set forth.

In testimony whereof I have signed my name to this specification in the presence of two subscribing witnesses.

EDGAR E. SELL.

Witnesses:
 B. E. BONNOITT,
 J. H. SELL.